United States Patent
Simmons

[11] Patent Number: 6,139,458
[45] Date of Patent: Oct. 31, 2000

[54] HYDROSTATIC/DIRECT DRIVE TRANSMISSION SYSTEM AND ASSOCIATED METHOD

[75] Inventor: Gerald P. Simmons, Morton, Ill.

[73] Assignee: Caterpillar Inc., Peoria, Ill.

[21] Appl. No.: 09/324,301

[22] Filed: Jun. 2, 1999

[51] Int. Cl.[7] .................................................. F16H 47/04
[52] U.S. Cl. ................................ 475/83; 475/80; 74/664
[58] Field of Search .............................. 475/72, 79, 80, 475/81, 82, 83; 74/661, 664

[56] References Cited

U.S. PATENT DOCUMENTS

| | | | |
|---|---|---|---|
| 3,714,846 | 2/1973 | Louis et al. | 475/79 |
| 3,744,344 | 7/1973 | Olsen et al. | 475/79 |
| 4,019,404 | 4/1977 | Schauer | 475/82 |
| 4,098,144 | 7/1978 | Besel et al. | 74/661 |
| 4,121,479 | 10/1978 | Schauer | 475/82 |
| 4,423,644 | 1/1984 | Coutant | 74/457 |
| 4,576,062 | 3/1986 | Reppert et al. | 74/740 |
| 4,776,233 | 10/1988 | Kita et al. | 74/687 |
| 4,813,298 | 3/1989 | Kurtossy | 74/681 |
| 4,813,306 | 3/1989 | Kita et al. | 74/687 |
| 4,815,335 | 3/1989 | Kurtossy | 74/681 |
| 4,981,050 | 1/1991 | Kurtossy | 475/198 |
| 4,986,377 | 1/1991 | Moriarty | 180/6.5 |
| 5,186,692 | 2/1993 | Gleasman et al. | 475/82 |
| 5,306,215 | 4/1994 | Mann et al. | 475/83 |
| 5,329,828 | 7/1994 | Hurth | 74/661 |

*Primary Examiner*—Charles A Marmor
*Assistant Examiner*—Ha Ho
*Attorney, Agent, or Firm*—Haverstock Garrett & Roberts; Jeffrey L. Myers

[57] ABSTRACT

The transmission system and associated method includes a drive shaft having a first input connected in rotatable communication with an output of a hydrostatic drive, and a second input adapted for connection in rotatable communication with a clutch selectably engageable with an engine for rotating the drive shaft therewith. The hydrostatic drive is selectably operable in at least a first drive mode for rotatably driving the drive shaft within a first or low rotational speed range, in a second drive mode for rotatably driving the drive shaft within a second or low-to-mid rotational speed range, and in a neutral mode for allowing the engine to directly drive the drive shaft when the clutch is engaged.

15 Claims, 3 Drawing Sheets

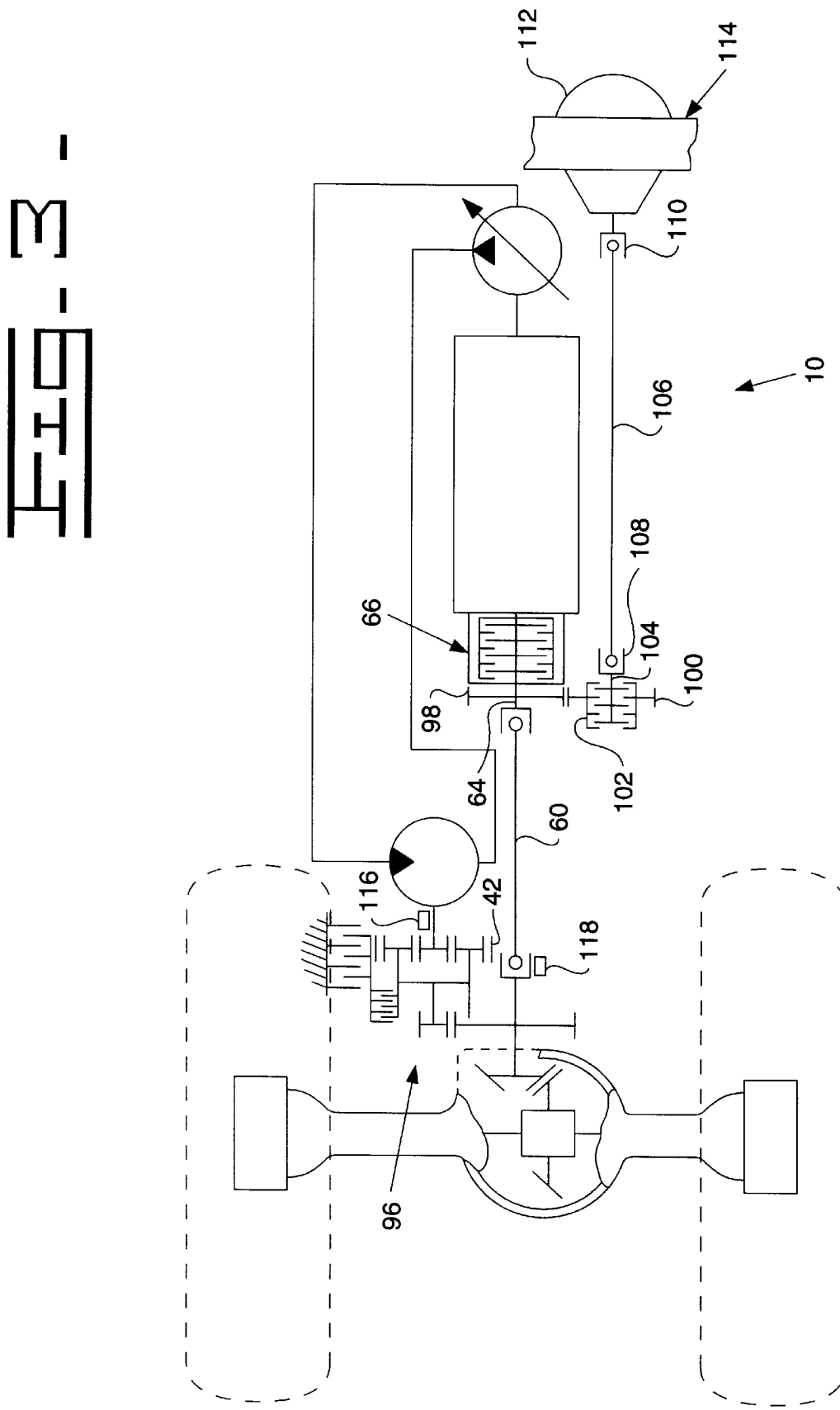

ically drives are used for propelling a wide variety of machines including, but not limited to, small tractors, combines, and skid steer loaders, under low and low-to-mid-range travel speed conditions. Advantages of the hydrostatic drives include efficiency at low speeds and ability to infinitely vary speed within the speed range thereof under load without clutching. However, hydrostatic drives have been found to be inefficient at mid-to-higher travel speeds, such as wherein a machine is to be driven over a road to or from a job site, and when used under such conditions, operation is often strained and travel speed is too slow.

6,139,458

1

HYDROSTATIC/DIRECT DRIVE TRANSMISSION SYSTEM AND ASSOCIATED METHOD

TECHNICAL FIELD

This invention relates generally to power train and drive line components for machines, and more particularly, to a transmission system and associated method for selectably operable for propelling a machine at low and mid range speeds using a multiple speed range hydrostatic drive, and under higher speeds using a direct engine drive for providing the advantages of hydrostatic operation at the low and mid range speeds and the advantages of direct engine drive at the higher speeds.

BACKGROUND ART

Currently, hydrostatic drives are used for propelling a wide variety of machines including, but not limited to, small tractors, combines, and skid steer loaders, under low and low-to-mid-range travel speed conditions. Advantages of the hydrostatic drives include efficiency at low speeds and ability to infinitely vary speed within the speed range thereof under load without clutching. However, hydrostatic drives have been found to be inefficient at mid-to-higher travel speeds, such as wherein a machine is to be driven over a road to or from a job site, and when used under such conditions, operation is often strained and travel speed is too slow.

As an alternative for mid-to-higher travel speeds, including road travel, or "roading" as it is known, multiple speed geared transmissions are preferred, as they provide excellent speed ranges. However, the need for clutching to disengage the engine when shifting, has been found to result in jerky operation and stalling at low speeds when under load.

For some machines, particularly small wheel loaders, back hoes and combinations thereof, a multiple speed geared transmission is coupled with a low ratio torque converter to provide both a limited roading capability and better low speed operability, but this has been found to provide less than desirable efficiency under the low speed conditions. Other machines have used hydro-mechanical transmissions including a multiple speed gear box in combination with a single speed range hydrostatic drive, but the single speed range hydrostatic drive provides only limited operability and efficiency.

Therefore, what is required is a transmission system providing the advantages of hydrostatic drive and direct drive which enables avoiding the attendant shortcomings and inefficiencies of the known transmission systems.

Accordingly, the present invention is directed to overcoming one or more of the problems as set forth above.

DISCLOSURE OF THE INVENTION

In one aspect of the present invention, a transmission system providing a multiple speed range hydrostatic drive in combination with a direct drive is disclosed. The present transmission system includes a drive shaft having a first input connected in rotatable communication with the output of the hydrostatic drive, and a second input adapted for connection in rotatable communication with a clutch selectably engageable with an engine for rotating the drive shaft therewith. The hydrostatic drive is selectably operable in at least a first drive mode for rotatably driving the drive shaft within a first or low rotational speed range, in a second drive mode for rotatably driving the drive shaft within a second or low-to-mid rotational speed range, and in a neutral mode for allowing the engine to directly drive the drive shaft when the clutch is engaged.

In another aspect of the present invention, a method for controlling a transmission system including a multiple speed range hydrostatic drive having an output is disclosed. The method includes the steps of rotatably connecting a drive shaft having a first input with the output of the hydrostatic drive, rotatably connecting the drive shaft having a second input with a clutch that is selectably engageable with an engine for rotating the drive shaft therewith, and selectively operating the hydrostatic drive in at least a first drive mode for rotatably driving the drive shaft within a first rotational speed range, in a second drive mode for rotatably driving the drive shaft within a second rotational speed range, and in a neutral mode for allowing the drive shaft to rotate with the engine when the clutch is engaged.

BRIEF DESCRIPTION OF THE DRAWINGS

For a better understanding of the present invention, reference may be made to the accompanying drawings in which:

FIG. 3 is a partial schematic and partial diagrammatic schematic representation of the machine of FIG. 1, including still another embodiment of a transmission system according to the present invention.

BEST MODE FOR CARRYING OUT THE INVENTION

Figure 1:
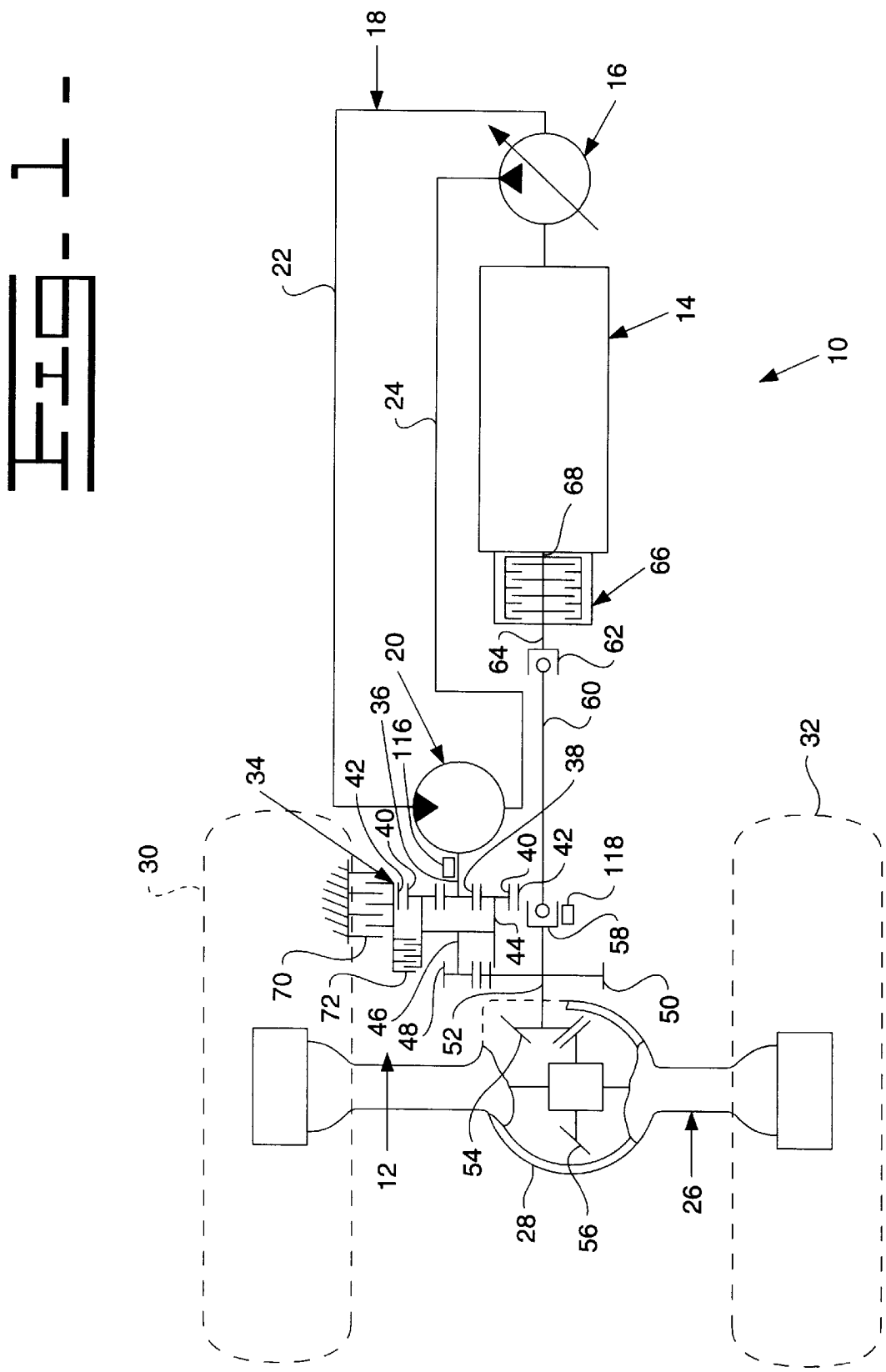
FIG. 1 is a partial schematic and partial diagrammatic representation of a machine including one embodiment of a transmission system according to the present invention.

Referring now to the drawings, FIG. 1 shows a machine 10 including one embodiment 12 of a transmission system constructed and operable according to the teachings of the present invention. Machine 10 is representative of a wide variety of different machines, including, but not limited to, a back hoe or wheel loader, in the provision of an internal combustion engine 14 connected in driving relation to a variable displacement hydraulic pump 16, which is part of a hydrostatic drive 18 including a hydraulic motor 20 connected in fluid communication with variable displacement pump 16 by hydraulic lines 22 and 24. Machine 10 further includes a drive axle assembly 26 including a differential 28 connected in driving communication with a pair of drive wheels 30 and 32.

Transmission system 12 includes a planetary gear set 34 including an input shaft 36 connected at one end in rotating communication with hydraulic motor 20 and at an opposite end with a sun gear 38 of gear set 34. Sun gear 38 is enmeshed with a plurality of planet gears 40 enmeshed with a ring gear 42. Planet gears 40 are supported for rotation on a carrier 44 including an output shaft 46 having an output gear 48 mounted thereto for rotation therewith. Output gear 48 is enmeshed with a gear 50 mounted to a drive shaft section 52 for rotation therewith, drive shaft section 52 having one end connected in rotating communication with a pinion gear 54 of differential 28.

Differential 28 is of conventional construction and operation, and includes a bevel gear 56 connected in driving relation with at least one of drive wheels 30 and 32, and enmeshed with pinion gear 54. An opposite end of drive shaft section 52 is connected via a universal joint 58 to a main drive shaft 60, which in turn is connected via a second universal joint 62 to an output shaft 64 of a clutch 66. Clutch 66 includes an input shaft 68 connected in rotating communication with a crank shaft (not shown) of internal combustion engine 14, and is conventionally operable when in an engaged mode for connecting input shaft 68 and output shaft 64 thereof in rotating communication.

Planetary gear set 34 also includes two clutches, including a ring clutch 70 connected between ring gear 42 and a housing or case (not shown) containing gear set 34, ring clutch 70 being engageable for resisting rotation of ring gear 42. The second clutch is a ring to carrier clutch 72 disposed between ring gear 42 and carrier 44 engageable for locking those gears together.

Figure 2:
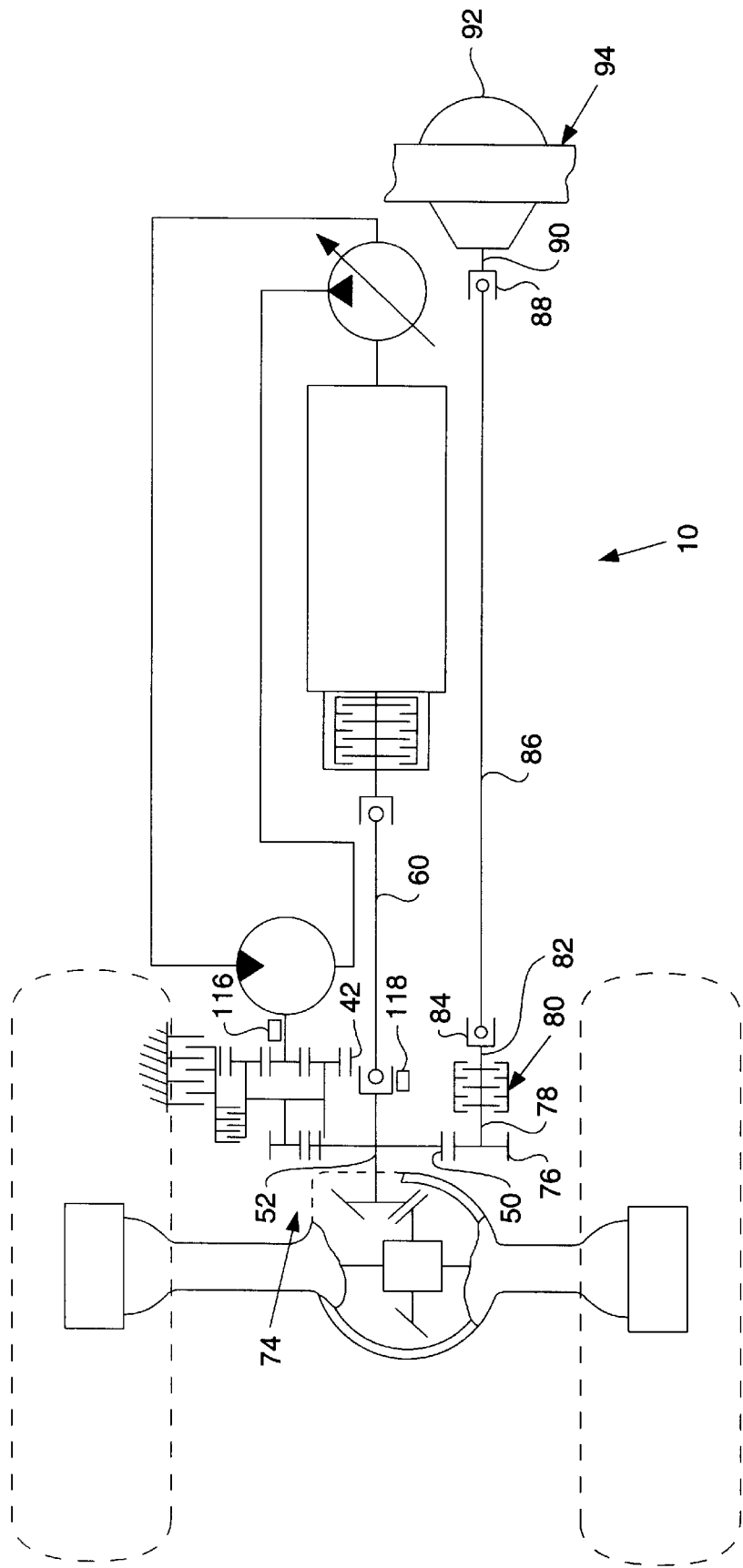
FIG. 2 is a partial schematic and partial diagrammatic representation of the machine of FIG. 1, including another embodiment of a transmission system according to the present invention.

Referring to FIG. 2, machine 10 is shown including another embodiment 74 of a transmission system constructed and operable according to the teachings of the present invention, like elements of embodiments 74 and 12 being identified by like numerals. Embodiment 74 includes all of the above-identified elements of embodiment 12, and additionally includes a transfer gear 76 enmeshed with gear 50 of drive shaft section 52, transfer gear 76 being mounted to an input shaft 78 of a transfer clutch 80. Transfer clutch 80 includes an output shaft 82 connected via a universal joint 84 to one end of a transfer shaft 86 with transfer shaft 86 having an opposite end connected via a universal joint 88 to an input shaft 90 of a differential 92 of a an auxiliary drive axle assembly 94 connected to auxiliary drive wheels (not shown). Transfer clutch 80 is selectably operable in an engaged mode for connecting input shaft 78 to output shaft 82 for rotation therewith, to allow power to also be provided to auxiliary drive axle assembly 94 as desired.

Turning to FIG. 3, machine 10 is shown including another embodiment 96 of a transmission system constructed and operable according to the teachings of the present invention, like parts of transmission system 96 and systems 74 and 12 being identified by like numerals. Embodiment 96 is essentially the same as embodiment 12, with the addition of a transfer gear 98 mounted to output shaft 64 of clutch 66 for rotation therewith. Transfer gear 98 is enmeshed with an input gear 100 of a transfer clutch 102 including an output shaft 104 connected to one end of a transfer shaft 106 by a universal joint 108 with the opposite end of transfer shaft 106 being connected by a universal joint 110 to a differential 112 of an auxiliary drive axle assembly 114.

Referring to FIGS. 1, 2 and 3, any of transmission system embodiments 12, 74 and 96 can include optional speed pick-ups 116 and 118 for determining the relative operating speeds of hydrostatic drive 18 and main drive shaft 60 to enable an operator to avoid engaging hydrostatic drive 18 when the drive shaft 60 is rotating at too high of a speed so that the hydrostatic drive 18 is not over-taxed, or to enable the operator to adjust the displacement of pump 16 to match the drive shaft speed relatively closely when engaging the hydrostatic drive 18. Pick-ups 116 and 118 can be devices of any suitable conventional construction and operation, such as magnetic pick-ups or the like, and can be conventionally connected to conventional warning lamps located in the operator cab or any other desired location.

Industrial Applicability

The present transmission systems 12, 74 and 96 have utility for a wide variety of machines, such as, but not limited to, back hoes, loaders and combination back hoe/loaders. The present transmission system is operable to propel the machine at low through low-to-mid-range speeds using the hydrostatic drive, and at mid-to-higher range speeds, including road speeds, using the direct drive shaft connection to the engine through the clutch 66.

The drive shaft 52, 60 has an output 58 adapted for connection to at least one drive axle 26 of a machine 10 on which the transmission system 12 is used, and when connected to the drive axle(s) 26 and the engine 14, the present transmission system 12 is operable to propel the machine at low through low-to-mid-range speeds using the hydrostatic drive 18, and at mid-to-higher range speeds, including road speeds, using the direct drive shaft 52, 60 connection to the engine 14 through the clutch 72, the speed ranges being overlapping, as desired.

In operation, engaging the ring clutch 70 to lock ring gear 42 provides a first drive mode of hydrostatic drive 12 for the lowest operating speed range, the displacement of pump 16 being infinitely variable between a lowest displacement and a greatest displacement thereof to provide a wide range of operability. Engaging ring to carrier clutch 72 with ring clutch 70 disengaged provides a second drive mode having a direct 1:1 connection between hydraulic motor 20 and output shaft 46 of planetary gear set 34, pump 16 again being infinitely variable between its lowest displacement and greatest displacement, to provide a wide range of low-to-mid speed range operability. With both ring clutch 70 and ring to carrier clutch 72 disengaged to place drive 18 in a neutral mode, clutch 66 can be engaged to provide mid-to-high speed range operability for roading and the like. In the instances of embodiments 74 and 96, the power can be selectively distributed to the respective auxiliary drive axle assembly 94 or 114 by engagement and disengagement of transfer clutches 80 and 102, as desired.

Other aspects, objects and advantages of the present invention can be obtained from a study of the drawings, the disclosure and the appended claims.

What is claimed is:

1. A transmission system comprising:

a multiple speed range hydrostatic drive having an output;

a drive shaft having a first input connected in rotatable communication with the output of the hydrostatic drive and a second input adapted for connection in rotatable communication with a clutch selectable engageable with an engine for rotating the drive shaft therewith;

the hydrostatic drive being selectable operable in at least a first drive mode for rotatably driving the drive shaft within a first rotational speed range, in a second drive mode for rotatably driving the drive shaft within a second rotational speed range, and in a neutral mode for allowing the drive shaft to rotate with the engine when the clutch is engaged;

wherein the hydrostatic drive includes a planetary gear set; and wherein the planetary gear set includes a ring gear, a carrier, and a clutch disposed between the ring gear and the carrier engageable for locking the ring gear and the carrier together for operating the hydrostatic drive in the second drive mode.

2. The transmission system of claim 1, wherein the drive shaft has an output adapted for connection in rotatable communication with at least one drive axle.

3. The transmission system of claim 1, wherein the planetary gear set includes a ring gear and a ring clutch engageable for preventing rotation of the ring gear for operating the hydrostatic drive in the first drive mode.

4. The transmission system of claim 1, further comprising an auxiliary drive selectably connectable in rotating communication with the driveshaft.

5. The transmission system of claim 4, wherein the auxiliary drive includes an element selectably engageable for engaging the auxiliary drive with the drive shaft.

6. The transmission system of claim 1, wherein the hydrostatic drive includes a hydrostatic loop including a motor and a pump connected in rotatably driven communication with the engine.

7. A transmission system comprising:

a multiple speed range hydrostatic drive having an output;

a drive shaft having a first input connected in rotatable communication with the output of the hydrostatic drive and a second input adapted for connection in rotatable communication with a clutch selectable engageable with an engine for rotating the drive shaft therewith;

the hydrostatic drive being selectable operable in at least a first drive mode for rotatably driving the drive shaft within a first rotational speed range, in a second drive mode for rotatably driving the drive shaft within a second rotational speed range, and in a neutral mode for allowing the drive shaft to rotate with the engine when the clutch is engaged; and wherein the hydrostatic drive includes a planetary gear set including a ring gear, a carrier, a ring clutch and a carrier to ring clutch, the ring clutch being engageable for preventing rotation of the ring gear for operating the hydrostatic drive in the first drive mode, and the carrier to ring clutch being engageable for locking the ring gear to the carrier for operating the hydrostatic drive in the second drive mode.

8. A transmission system comprising:

a multiple speed range hydrostatic drive having an output wherein the hydrostatic drive includes a planetary gear set including a ring gear, a carrier, a ring clutch and a carrier to ring clutch, the ring clutch being engageable for preventing rotation of the ring gear for operating the hydrostatic drive in the first drive mode, and the carrier to ring clutch being engageable for locking the ring gear to the carrier for operating the hydrostatic drive in the second drive mode;

a drive shaft having a first input connected in rotatable communication with the output of the hydrostatic drive and a second input adapted for connection in rotatable communication with a clutch selectably engageable with an engine for rotating the drive shaft therewith; and the hydrostatic drive being selectably operable in at least the first drive mode for rotatably driving the drive shaft within a first rotational speed range, in the second drive mode for rotatably driving the drive shaft within a second rotational speed range, and in a neutral mode for allowing the drive shaft to rotate with the engine when the clutch is engaged.

9. A method for controlling a transmission system including a multiple speed range hydrostatic drive having an output, the method comprising the steps of:

rotatably connecting a drive shaft having a first input with the output of the hydrostatic drive;

rotatably connecting the drive shaft having a second input with a clutch that is selectable engageable with an engine for rotating the drive shaft therewith; and selectively operating the hydrostatic drive in at least a first drive mode for rotatably driving the drive shaft within a first rotational speed range, in a second drive mode for rotatably driving the drive shaft within a second rotational speed range, and in a neutral mode for allowing the drive shaft to rotate with the engine when the clutch is engaged;

wherein the hydrostatic drive includes a planetary gear set; and wherein the planetary gear set includes a ring gear, a carrier, and a clutch disposed between the ring gear and the carrier and further including the step of engaging the carrier for locking the ring gear and the carrier together for operating the hydrostatic drive in the second drive mode.

10. The method of claim 9, further including the step of rotatably connecting the drive shaft that has an output with at least one drive axle.

11. The method of claim 9, wherein the planetary gear set includes a ring gear and a ring clutch and further including the step of engaging the ring clutch for preventing rotation of the ring gear for operating the hydrostatic drive in the first drive mode.

12. The method of claim 9, further including the step of selectably connecting an auxiliary drive in rotating communication with the drive shaft.

13. The method of claim 12, further including the step of selectably engaging the auxiliary drive, includes an element, with the drive shaft.

14. The method of claim 9, wherein the hydrostatic drive includes a hydrostatic loop including a motor and a pump rotatably connected in driven communication with the engine.

15. A method for controlling a transmission system including a multiple speed range hydrostatic drive having an output, the method comprising the steps of:

rotatably connecting a drive shaft having a first input with the output of the hydrostatic drive;

rotatably connecting the drive shaft having a second input with a clutch that is selectable engageable with an engine for rotating the drive shaft therewith; and selectively operating the hydrostatic drive in at least a first drive mode for rotatably driving the drive shaft within a first rotational speed range, in a second drive mode for rotatably driving the drive shaft within a second rotational speed range, and in a neutral mode for allowing the drive shaft to rotate with the engine when the clutch is engaged; and wherein the hydrostatic drive includes a planetary gear set including a ring gear, a carrier, a ring clutch and a carrier to ring clutch, further including the step of engaging the ring clutch with the ring gear to prevent rotation of the ring gear and for operating the hydrostatic drive in the first drive mode, and further including the step of engaging the carrier to the ring clutch for locking the ring gear to the carrier for operating the hydrostatic drive in the second drive mode.

* * * * *